Nov. 2, 1954    A. J. JOHN    2,693,045
FISHING APPARATUS
Filed Sept. 13, 1952
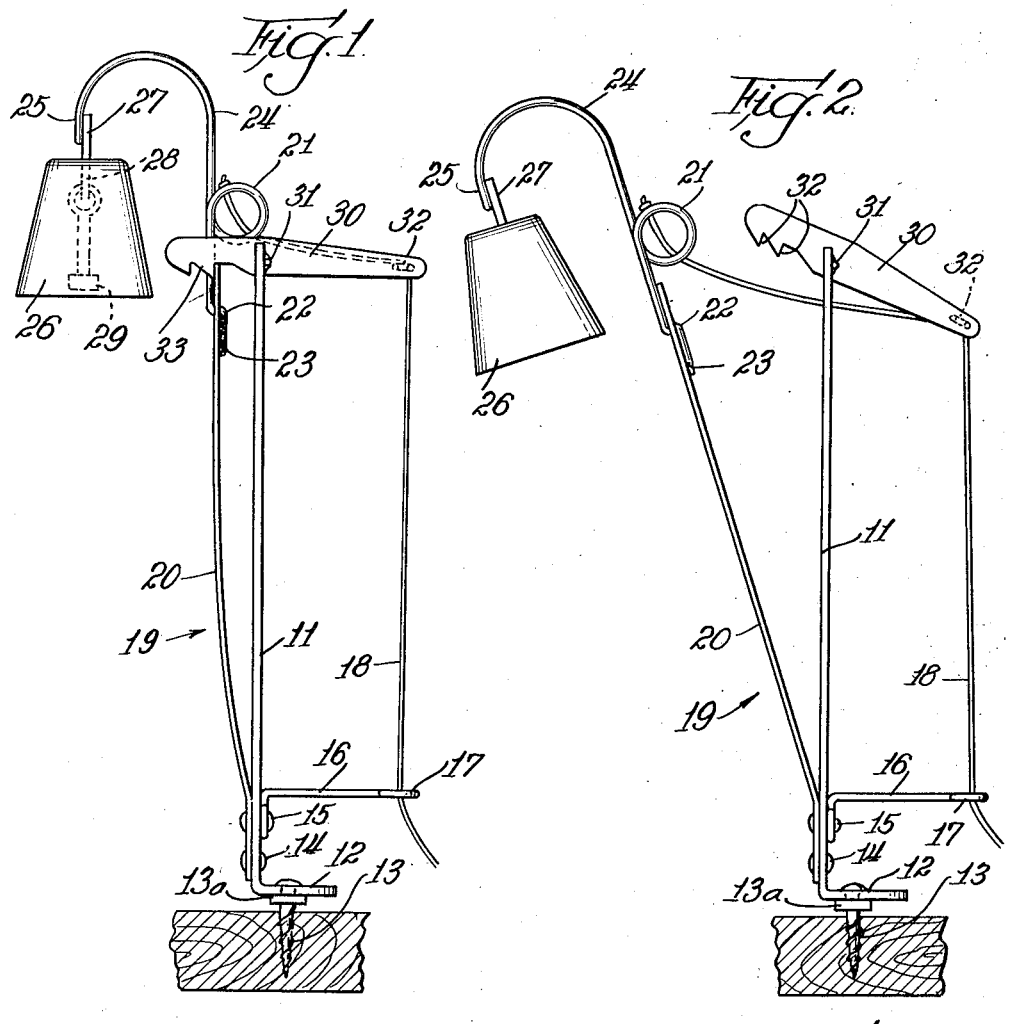
INVENTOR.
Albert J. John
BY
Archibald D. H. Hellar
Atty.

United States Patent Office 2,693,045
Patented Nov. 2, 1954

2,693,045

FISHING APPARATUS

Albert J. John, Cicero, Ill.

Application September 13, 1952, Serial No. 309,478

1 Claim. (Cl. 43—16)

The invention relates to the art of fishing with a baited-hook and line, but more particularly to the operation of a warning sound signal which is adapted to be set in advance, and afterwards released for action by a pull on the baited-hook from the immersed end of said line, and has for its objects the provision of a device of this character which will be simple in construction, economical to manufacture, and highly efficient in use.

Other objects will appear hereinafter.

The invention consists in the combinations and arrangements of parts hereinafter shown, described and claimed.

The invention will be best understood by reference to the accompanying drawings forming a part of this application, and in which Fig. 1 is a vertical view of the device as arranged for use and mounted on a suitable wood base;

Fig. 2 is a vertical view of the device as arranged in neutral or released position and secured to a suitable base;

Fig. 3 is a top plan view of Fig. 1; and

Fig. 4 is a perspective view of a fish line guide which projects forwardly adjacent the lower end of said device.

The device illustrated in Fig. 1 of the drawings comprises a substantially rigid standard 11 rectangular in cross section, and provided with a forwardly projecting foot 12 equipped with a downwardly projecting wood screw 13 arranged in spaced and parallel relation with said standard, and provided with a fixed shoulder 13a on the underside of said foot 12 and preferably secured thereto by welding.

The vertical standard 11 is provided adjacent its lower end with suitable rivets 14 and 15. The rivet 15 is arranged and adapted to carry the forwardly projecting guide member 16 having at its outer end an open loop 17 through which the line 18 is adapted to slide freely. Secured to the rearward side of the standard 11 and adjacent its bottom and secured to the rivets 14 and 15 is the sound operating mechanism 19 which comprises a flat leaf spring 20, rectangular in cross section, and extending upwardly and rearwardly therefrom. The upper end of the leaf spring 20 is provided adjacent its free upper end with a suitable hole through which the lower end of the helical spring 21 which is provided with a forwardly and downwardly extending offset portion 22 adapted to pass through said leaf spring 20 from the rearward side to the forward side thereof and to be welded at its lower end 23 to the leaf spring 20, as best shown in Figs. 1 and 2.

The other end of the helical spring 21 comprises an inverted U-shaped loop 24 attached at its outer rearward end 25 to a conventional bell 26 having an upwardly extending lug 27 which extends into said bell 26 where it is provided with a link connection 28 carrying a clapper 29. This clapper 29 is adapted to swing forwardly and rearwardly upon the release of the leaf spring 20 from engagement with a latch lever, as best shown in Fig. 2.

Suitable mechanism for releasably engaging the leaf spring 20 carrying the bell 26, comprises a horizontal latch lever 30 mounted intermediate its ends on a transverse pivot 31 welded at its ends to spaced prongs 11a and 11b at the upper forward face of the standard 11, as shown in Figs. 1 and 3. The said lever 30 is constructed of flat rigid material and is provided at its lower rearward edge with a plurality of teeth 33 and at its forward end with an open loop 32. The teeth 33 are arranged and adapted to releasably engage the upper end of the leaf spring 20, as best shown in Fig. 1, upon a pull on the bait end of the line 18 passing through the open loop 32 and downwardly through the loop 17 at the forward end of the guide member 16. The inner or shore end of the line 18 is connected to the helical spring 21 by being impinged between its helices, as best shown in Figs. 2 and 3. The resulting effect of a pull on the bait end of the line 18 is to pull the lever 30 downwardly at its forward end at 32 and to free the teeth 33 from engagement with the upper end of the flat leaf spring 20. The rearward end or shore end of the line 18 is given a quick jerk by the rearward movement of the upper end of said leaf spring 20, thereby setting the baited hook in the mouth of the fish, as will be readily understood by those skilled in the art.

In use, the device is mounted in vertical position by means of the wood screw 13 attached to any suitable material with the bell placed rearwardly of the line 18, as will be readily understood, care being taken that obstructions do not intervene to prevent free play of the line 18 in the water. From the helical spring 21, the line 18 passes through an open loop 32 carried by the outer end of the horizontal lever 30 and is passed downwardly and engaged by an open loop 17 carried by the outer end of the guide member 16.

While I have illustrated and described my invention in a selected form, this selection is capable of re-arrangement and adjustments of parts without departing from the invention. I therefore do not wish to be limited to the precise arrangement as shown and described, but desire to avail myself of such structures as may fall within the spirit and scope of the appended claim.

A device of the character described, composed of an erectable vertical standard, a long flat spring in the rear of and rising from a point near the lower end of the standard, a forwardly-projecting guide member at the lower end of the standard, a rivet extending through the flat spring, the standard and said guide member to hold them together, said flat spring being shaped to recede rearwardly from the standard from the lower end to the upper end when not under stress, an alarm device attached to the upper end of the flat spring and including an anchoring device at about the level of the top of the standard for the end of a fish line, a rocking latching lever mounted on the upper end of the standard for engaging the upper end of the flat spring when the latter is stressed so that a major portion thereof lies parallel to the standard when the lever is horizontal, said guide member and said lever having thereon loops aligned vertically for guiding a line that passes from the upper of the two loops directly to said anchoring device.

References Cited in the file of this patent

UNITED STATES PATENTS

| Number | Name | Date |
| --- | --- | --- |
| 279,556 | Fisher | June 19, 1883 |
| 422,331 | Bradford | Feb. 25, 1890 |
| 975,822 | Becker et al. | Nov. 5, 1910 |
| 1,317,843 | Wehner et al. | Oct. 7, 1919 |
| 1,591,751 | Ebert | July 6, 1926 |